(12) United States Patent
Sodhi et al.

(10) Patent No.: US 12,307,381 B2
(45) Date of Patent: May 20, 2025

(54) TECHNOLOGY FOR AUGMENTED REALITY PRESENTATION AND RECOMMENDATIONS REGARDING PROXIMATE POINTS OF INTEREST

(71) Applicant: International Business Machines Corporation, Armonk, NY (US)

(72) Inventors: Manjit Singh Sodhi, Bangalore (IN); Raghuveer Prasad Nagar, Kota (IN); Jagadesh Ramaswamy Hulugundi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 17/481,714

(22) Filed: Sep. 22, 2021

(65) Prior Publication Data
US 2023/0099573 A1    Mar. 30, 2023

(51) Int. Cl.
*G06N 5/02* (2023.01)
(52) U.S. Cl.
CPC ..................... *G06N 5/02* (2013.01)
(58) Field of Classification Search
CPC ....................................................... G06N 5/02
See application file for complete search history.

(56) References Cited

U.S. PATENT DOCUMENTS

| | | | |
|---|---|---|---|
| 8,175,908 B1* | 5/2012 | Anderson | G06Q 30/0201 705/7.29 |
| 10,163,129 B1* | 12/2018 | Agarwal | G06Q 30/0255 |
| 11,215,467 B1* | 1/2022 | Neumann | G06N 20/00 |
| 2014/0279294 A1 | 9/2014 | Field-Darragh | |
| 2020/0151265 A1* | 5/2020 | Gupta | G06Q 10/02 |
| 2021/0350330 A1* | 11/2021 | Howard, Jr. | G06N 20/00 |
| 2022/0292543 A1* | 9/2022 | Henderson | G06Q 30/0252 |

OTHER PUBLICATIONS

"A model that provides personal shopping recommendations by familiarising itself with the buyer," Authors Anonymous, IP.com No. IPCOM000229598D, IP.com Electronic Publication Date: Aug. 6, 2013.

(Continued)

*Primary Examiner* — Calvin Cheung
(74) *Attorney, Agent, or Firm* — Teddi E. Maranzano (57) ABSTRACT

A computer system implemented method for a user includes gathering, by a computer system, records of sources that each have no website and that the computer system, therefore, deems to be nondigital sources. The gathering includes the computer system receiving identifications of the nondigital sources based on transactions of other users with the respective sources. The computer system selects candidate sources from among the nondigital sources based on a geolocation of the first user and geolocations of the sources. The computer system selects a final source from among the candidate sources, wherein the computer system selecting the final source includes an artificial intelligence model fitting attributes of the candidate sources to attributes valued by the first user. The computer system presents the final source to the first user as a recommendation by the computer system.

20 Claims, 7 Drawing Sheets

(56) References Cited

OTHER PUBLICATIONS

Scottie Gardonio, "Augmented and Virtual Reality Shopping—Retailers Beware," Aug. 12, 2017, https://www.iotforall.com/augmented-virtual-reality-shopping.

"Augmented Reality Retail Applications & VR Store Solutions," https://theappsolutions.com/blog/development/ar-vr-retail-store, downloaded Aug. 26, 2020.

Ayn de Jesus, "Augmented Reality Shopping and Artificial Intelligence—Near-Term Applications," Apr. 20, 2020, https://emerj.com/ai-sector-overviews/augmented-reality-shopping-and-artificial-intelligence.

Anurag, "How eCommerce can increase sales with Augmented Reality, Data mining and Artificial Intelligence," Sep. 3, 2018, https://www.newgenapps.com/blog/how-ecommerce-can-increase-sales-with-augmented-reality-data-mining-and-artificial-intelligence.

"Product and Vendor Selection in a Reverse Purchase Model Using Dynamically Weighted Multivariate Criteria," Authors Anonymous, IP.com No. IPCOM000261460D, IP.com Electronic Publication Date: Mar. 6, 2020.

NIST Special Publication 800-145 The NIST Definition of Cloud Computing, Peter Mell, et al., Computer Security Division, Information Technology Laboratory, National Institute of Standards and Technology, Gaithersburg, MD 20899-8930, Sep. 2011, http://csrc.nist.gov/groups/SNS/cloud-computing/index.html.

\* cited by examiner

| SOURCE | DISTANCE | TRANSACTION TIME | LANGUAGE | CHECK/ CREDIT | COURTESY | ETA |
|---|---|---|---|---|---|---|
| A | 50 | 3 | ENGLISH/SPANISH | C/C | 5 | -4 |
| B | 75 | 5 | ENGLISH/MANDARIN | C/- | 2 | -3 |
| C | 120 | 3 | ENGLISH/SPANISH | C/C | 4 | 0 |
| D | 105 | 7 | SPANISH | -/- | 4 | -1 |
| E | 120 | 4 | ENGLISH | -/- | 5 | -1 |

← DISPLAY

US 12,307,381 B2

TECHNOLOGY FOR AUGMENTED REALITY PRESENTATION AND RECOMMENDATIONS REGARDING PROXIMATE POINTS OF INTEREST

BACKGROUND

The present invention relates to augmented and virtual reality presentation, and more specifically, to presentation of recommendations concerning proximate points of interest for resources.

SUMMARY

In an embodiment of the present invention, a computer system implemented method for a user includes gathering, by a computer system, records of sources that each have no website and that the computer system, therefore, deems to be nondigital sources. The gathering includes the computer system receiving identifications of the nondigital sources based on transactions of other users with the respective sources. The computer system selects candidate sources from among the nondigital sources based on a geolocation of the first user and geolocations of the sources. The computer system selects a final source from among the candidate sources, wherein the computer system selecting the final source includes an artificial intelligence model fitting attributes of the candidate sources to attributes valued by the first user. The computer system presents the final source to the first user as a recommendation by the computer system.

In other embodiments of the invention, other forms are provided, including a system and a computer program product.

BRIEF DESCRIPTION OF THE DRAWINGS

Features and advantages of the present invention will be more readily understood with reference to the attached figures and following description, wherein.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 3:
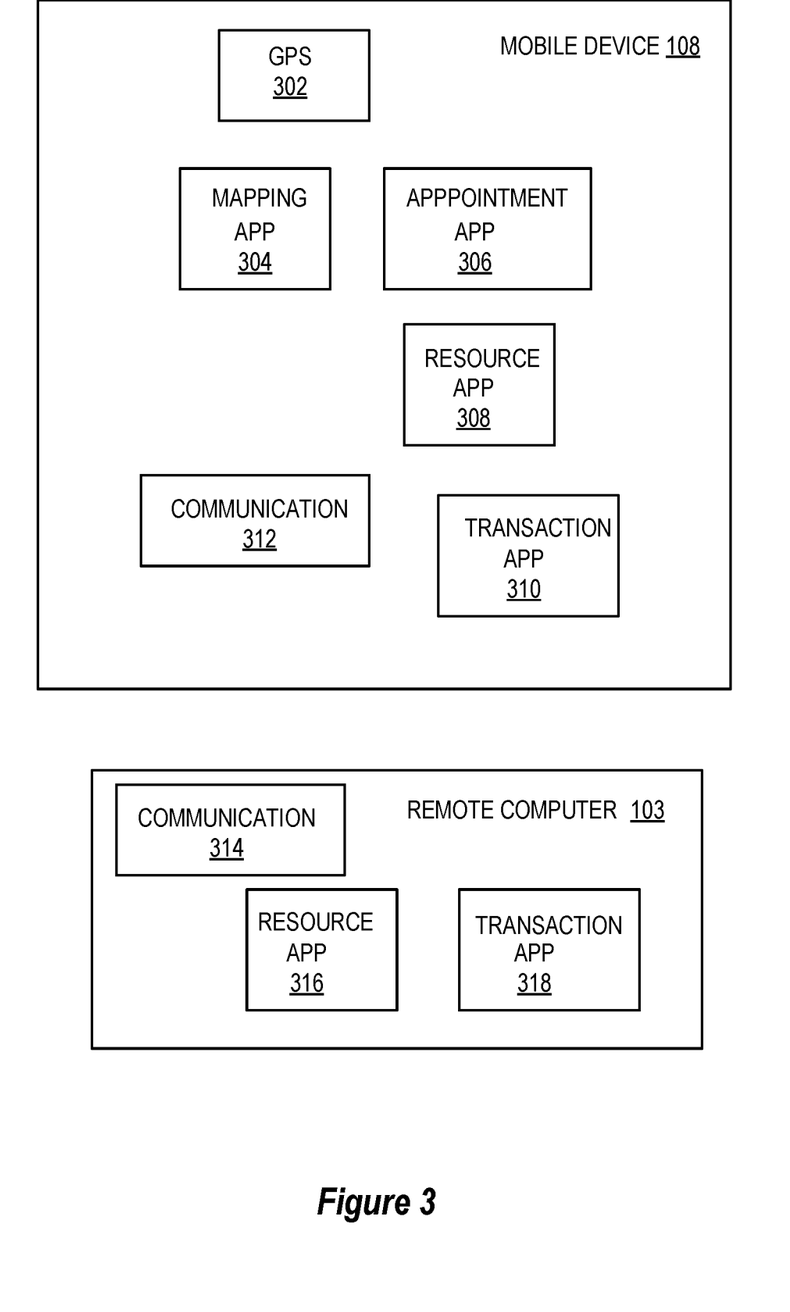
FIG. 3 is a block diagram of the system depicted in FIG. 1, according to at least one embodiment of the present invention.
Figure 4:
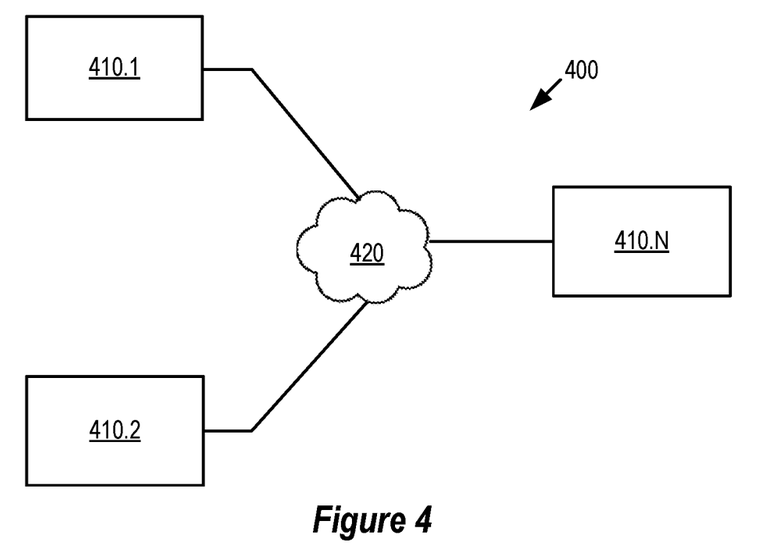
FIG. 4 illustrates a networked computer environment, according to at least one embodiment of the present invention.

FIG. 4 illustrates an example computing environment 400 suitable for embodiments of the present invention. As shown, computing environment 400 includes computer systems 410.1, 410.2 through 410.N connects via network 420, which may be a public or private network. Systems 410.1, 410.2, etc. include modules, which may be program or hardware modules, configured to perform tasks for their own respective systems or for other systems or both, including tasks as described for elements of FIGS. 1 through 3 herein.

Figure 5:
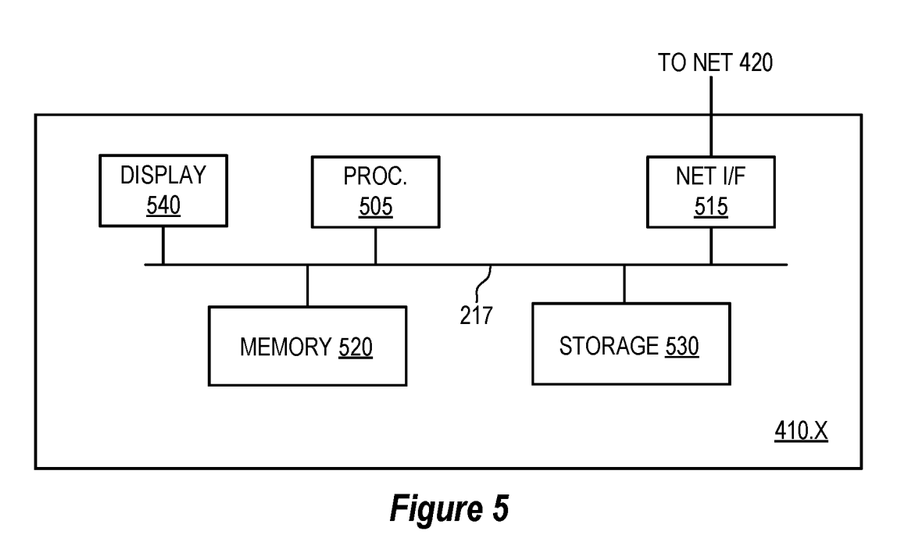
FIG. 5 is a block diagram of a computer system such as those shown in FIG. 4, according to at least one embodiment of the present invention.

FIG. 5 illustrates details of a computer system 410.X suitable as computer systems 410.1, 410.2, etc. according to embodiments of the present invention, wherein system 410.X includes at least one central processing unit (CPU) 505, network interface 515, interconnect (i.e., bus) 517, memory 520, storage device 530 and display 540. CPU 505 may retrieve and execute programming instructions stored in memory 520 for applications. Similarly, CPU 505 may retrieve and store application data residing in memory 520. Interconnect 517 may facilitate transmission, such as of programming instructions and application data, among CPU 505, storage 530, network interface 515, and memory 520. CPU 505 is representative of a single CPU, multiple CPUs, a single CPU having multiple processing cores, and the like. Additionally, memory 520 is representative of a random-access memory, which includes data and program modules for run-time execution. It should be understood that system 410.X may be implemented by other hardware and that one or more modules thereof may be firmware.

Disclosed is a method, system and computer program product, according to embodiments of the present invention, wherein a mobile device discovers and identifies resources that are available from nearby sources for resources needed by a first user, as well as attributes of the sources and attributes of available resources provided by the sources. Further, the mobile device includes augmented reality (AR) glasses that present the resources, resource attributes, sources and source attributes to a user, which includes presenting comparisons of the resources, resource attributes, sources and source attributes. The identifying includes evaluating the resources, resource attributes, sources and source attributes via artificial intelligence (AI). In at least one alternative, the discovery includes discovery via Internet connected sensors (IoT), which capture user characteristics, language traits, negotiation skills, etc. as part of transactions across a variety of sources.

The technology disclosed enables the mobile device to determine the resources for presenting to a user such that the resources relate to the user's current needs and preferences and such that the sources are located within line-of-sight of the user, within a predetermined proximity or within an identifiable local district.

In an embodiment of the present invention, the technology enables the mobile device to make selections as described herein and present the selections according to the following and various combinations thereof:

sources not identified on a public computer system network;

source attributes not identified on a public computer system network for the respective sources;

itemized resources available from the respective sources not identified on a public computer system network associations between the resources and the respective sources not identified on a public computer system network; and resource attributes not identified on a public computer system network for the respective resources and sources.

For example, in various embodiments of the present invention, the technology enables the mobile device to make selections as described herein (and to present) for the following:

resources and a selected source, where the resources and the source has no association identified on a public computer system network;

resources and a selected source, where the selected source is not identified on a public computer system network;

resource attributes and a selected source, where the resource attributes available from the source are not identified on a public computer system network;

resources available from a source and attributes of the source, where the source attributes are not identified on a public computer system network; and resources, resource attributes and source for the resources having the resource attributes, where the attributes of the resources available from the source are not identified on a public computer system network.

Among other applications, the disclosed technology is particularly useful for various small shops, including food trucks, that do not have volumes nor financial strength to digitize. These may be sources that sell inexpensive items, items that have short shelf-life, or items prepared on demand, for example. Their customers may be pedestrians, in-transit passengers at metro stations, people on the go who have an immediate need and no time for supermarkets, or in locations where there is no large store, tourists and visitors roaming around, audience members attending events, etc.

Growth of these small suppliers may be limited due to competition from digital sellers, particularly since customers are accustomed to online shopping, where details are readily available. For example, customers often need information, such as:

Which sellers in close proximity have the needed product or service.

Which seller has better quality/freshness at a reasonable price?

What languages does each seller understand and speak?

Which sellers will negotiate price?

What forms of payment does each seller accept?

In an embodiment of the present invention, a system disclosed herein uses artificial intelligence (AI), augmented reality (AR) and Internet of things (IoT) to select and present a user who is a shopper with item offerings of selected non-digital sources, i.e., sellers of products or services, where the system selects the sources based on a geolocation limitation. In various alternatives "non-digital sources" refers to sources that satisfy one or more of the following conditions:

do not sell products or services via any website(s) and do not otherwise sell any products or services via any public computer network do not list any products or services on any website(s) and do not otherwise list any products or services on any public computer network are not identified on any website(s) and are not otherwise identified on any public computer network do not have websites.

Particularly, the system includes AR glasses and presents the offerings via at least one of visual presentation and audible presentation on the AR glasses. In one alternative, the geolocation limitation limits the selected sources to those within a line-of-sight of the shopper. In another alternative, the geolocation limitation limits the selected sources to those within a predetermined range of proximity, but not necessarily within line-of-sight.

The system further limits the presented offerings to selected offerings, where the system selects offerings that meet the user's needs, urgency and historical preferences, i.e., affinity or aversion, such as needs and urgency and preferences concerning category, price, quality, source's courtesy, transaction time, etc.

In one alternative, the presented offerings also include those of selected digital sources. Further, the selected digital sources may be limited to digital sources having the offered item in stock.

The system recommends to the user one of the selected offerings as a suggested best choice, which the system determines based on offerings from both networked sources and the non-networked sources. In one alternative, both types of sources are within the geolocation limitation.

In one alternative, if the selected sources are not within a line-of-sight of the user, the system presents on the AR glasses an indication of proximity of each source to the user. In one alternative, this includes presenting a map showing locations of the respective sources. In one alternative, this includes presenting a list of distances between the user and the respective sources.

The system may include a tracking aspect, wherein when the system presents the user with the item offerings of the selected sources and the user buys the item, the system responsively stores a record of the sale along with related transaction data including price, source characteristics, etc. and accordingly applies reinforcement mechanisms for reward/penalties to be absorbed into subsequent recommendations. That is, the system uses the record of historical transactions as input for selecting offerings in future transactions.

Figure 1:
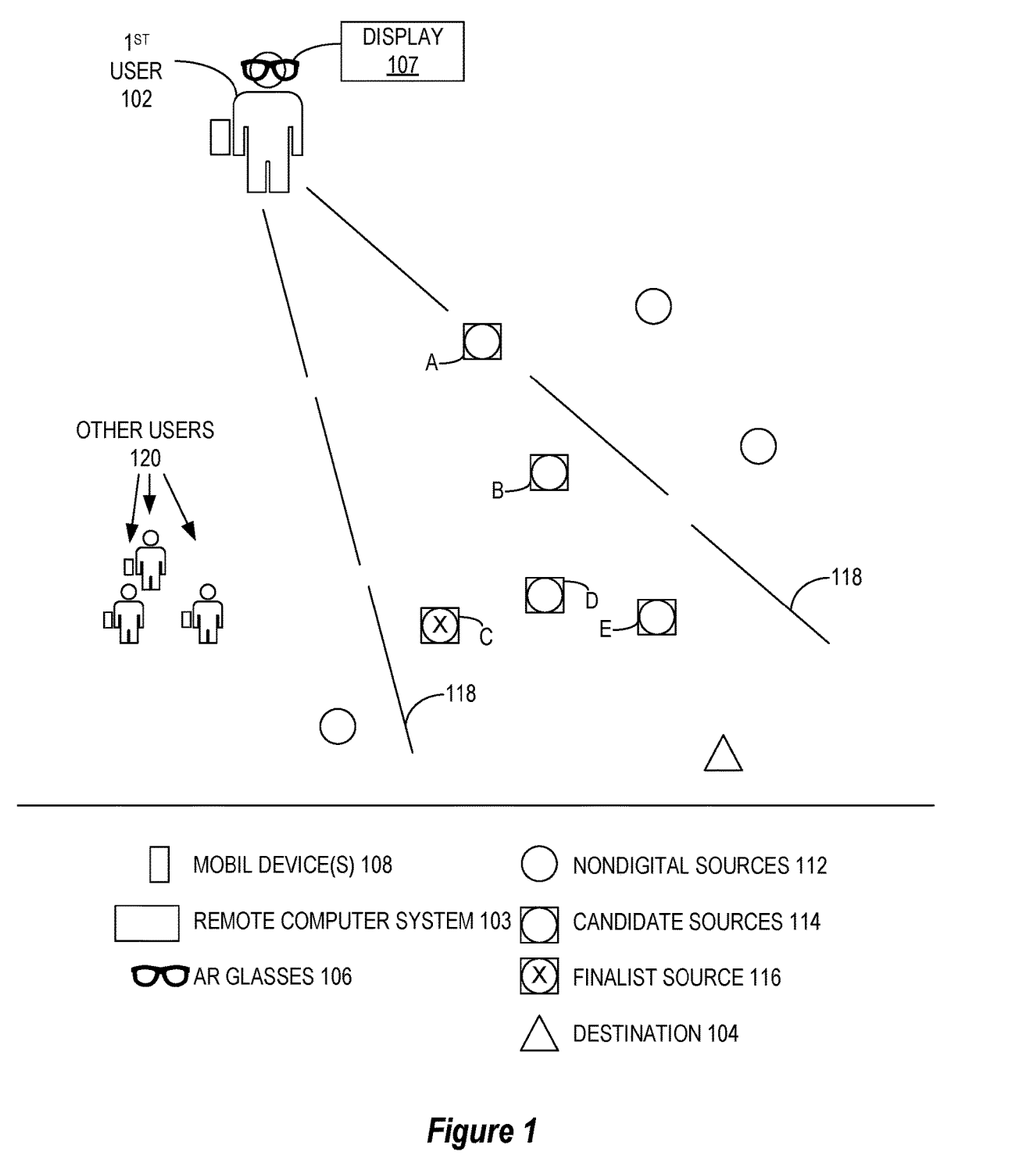
FIG. 1 illustrates an example of a system in which a user wants to immediately buy from a source, which includes non-digital sources, according to at least one embodiment of the present invention.

Referring now to FIG. 1, an example of system 101 operation is shown, according to one or more embodiments of the present invention, in which a user 102—who is walking from a transit station to an appointed destination 104, such as a friend's place for dinner—announces to system 101 via his/her cell phone 108 or AR glasses 106 he/she is wearing that he/she wants to immediately buy a snack, a box of chocolates and a flower bouquet from some source, which includes non-digital sources 112. (The snack is to eat now, and the other items are to take to his friend.) As user 102 leaves the transit station, system 101 first identifies non-digital shops 112 that are nearby as candidate non-digital shops 114. System 101 may deem nearby shops 114 to be those that are within line of sight 118 of user 102, such as due to a preference indicated by user 102 to system 101. System 101 may, accordingly, first identify non-digital shops via line of sight of AR glasses 106 communicating with a remote computer system 103, which is a component of the computer system in the presently described embodiment. More specifically, in one way of identifying the candidate non-digital shops 114, system 101 may capture images via user 102's AR glasses 106 and find matching images for those shops among non-digital shops 112 that system 101 has captured from other users 120 of system 101.

Figure 8:
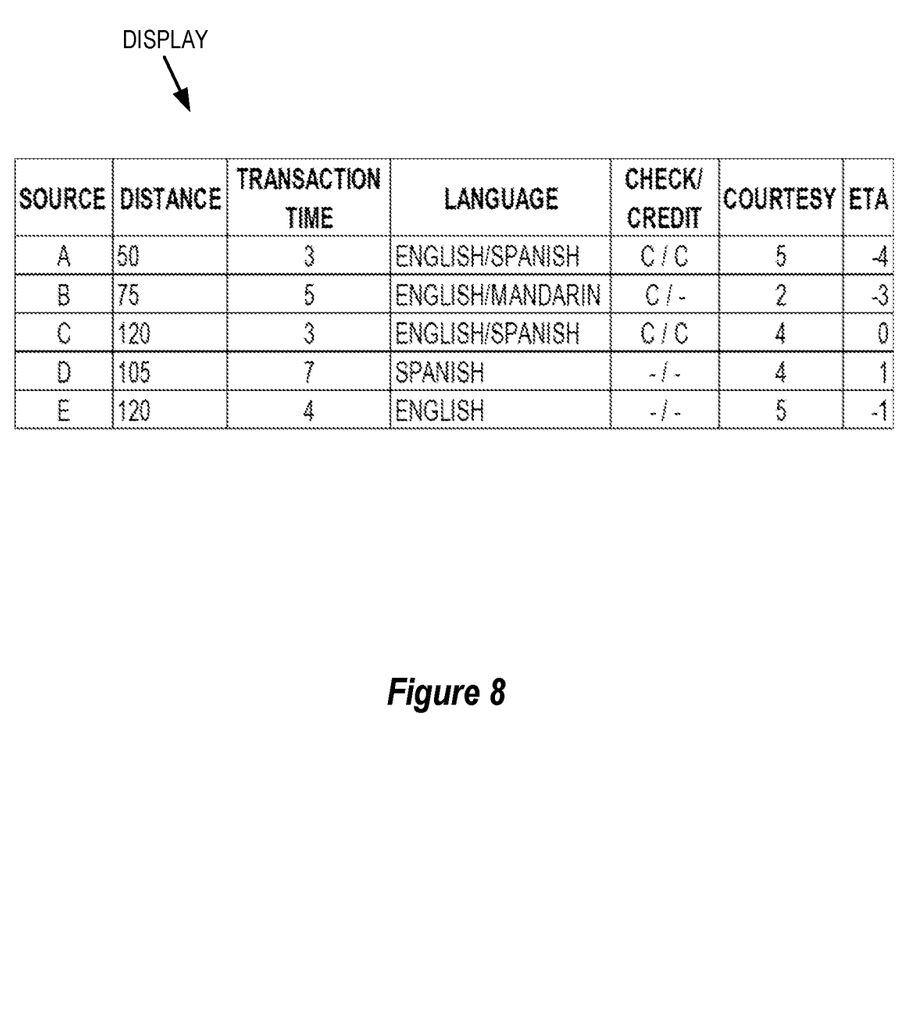
FIG. 8 illustrates an example of an augmented reality display, according to at least one embodiment of the present invention.

Referring now to FIG. 8, an example of an augmented reality display is depicted, according to at least one embodiment of the present invention.

Referring now to FIG. 3, a block diagram of the system of FIG. 1 is depicted, according to embodiments of the present invention, in which mobile device 108 includes GPS 302, mapping app 304, appointment app 306, resource app 308, transaction app 310, and communication app 312. Remote computer 103 includes communication app 314, resource app 314, and transaction app 318.

Referring now to FIGS. 1, 8, and 3, in another way regarding line of sight 118, system 101 may obtain user 102's location by communicating with a GPS 302 of user 102's phone 108 or of the AR glasses 106 and obtain user 102's line of sight 118 from a direction AR glasses 106 are facing by communicating with GPS 302 of AR glasses 106, then find the shops 114 indicated from among those shops 112 for which system 101 has captured geolocation data via other users 120 of system 101. (It should be appreciated that AR glasses 106, mobile phone 108 and GPS'es thereof are considered herein to be part of system 101.) In another alternative for identifying the nearby shops 114, system 101 may deem nearby shops 114 to be those that are within a predetermined distance from user 102, such as due to a preference indicated by user 102 to system 101. System 101 may, accordingly, identify candidate non-digital shops 114 within the predetermined distance by communicating with GPS 302 of user 102's phone 108 or of AR glasses 106, then find the nearby shops 114 from among those shops 112 for which system 101 has captured geolocation data via other users 120 of system 101.

Next, system 101 determines ones of the identified, nearby shops 114 selling the items that user 102 has indicated he/she wants. System 101 does this by comparing those items user 102 has indicated he/she wants to those items sold by the shops, which system 101 has collected for the shops from transactions with those shops by other users who have used the same system 101. Likewise, system 101 has already captured prices for the items at those shops, has learned the languages spoken by the shop personnel, etc. Accordingly, system 101 displays to user 102 on AR glasses 106 pricing, quality and category data of items he/she wants to buy for each of the nearby shops identified that sell the items. every seller is displayed. System 101 also determines and likewise displays a best shop recommendation by considering the factors that user 102 values, such as have been described herein.

Figure 2:
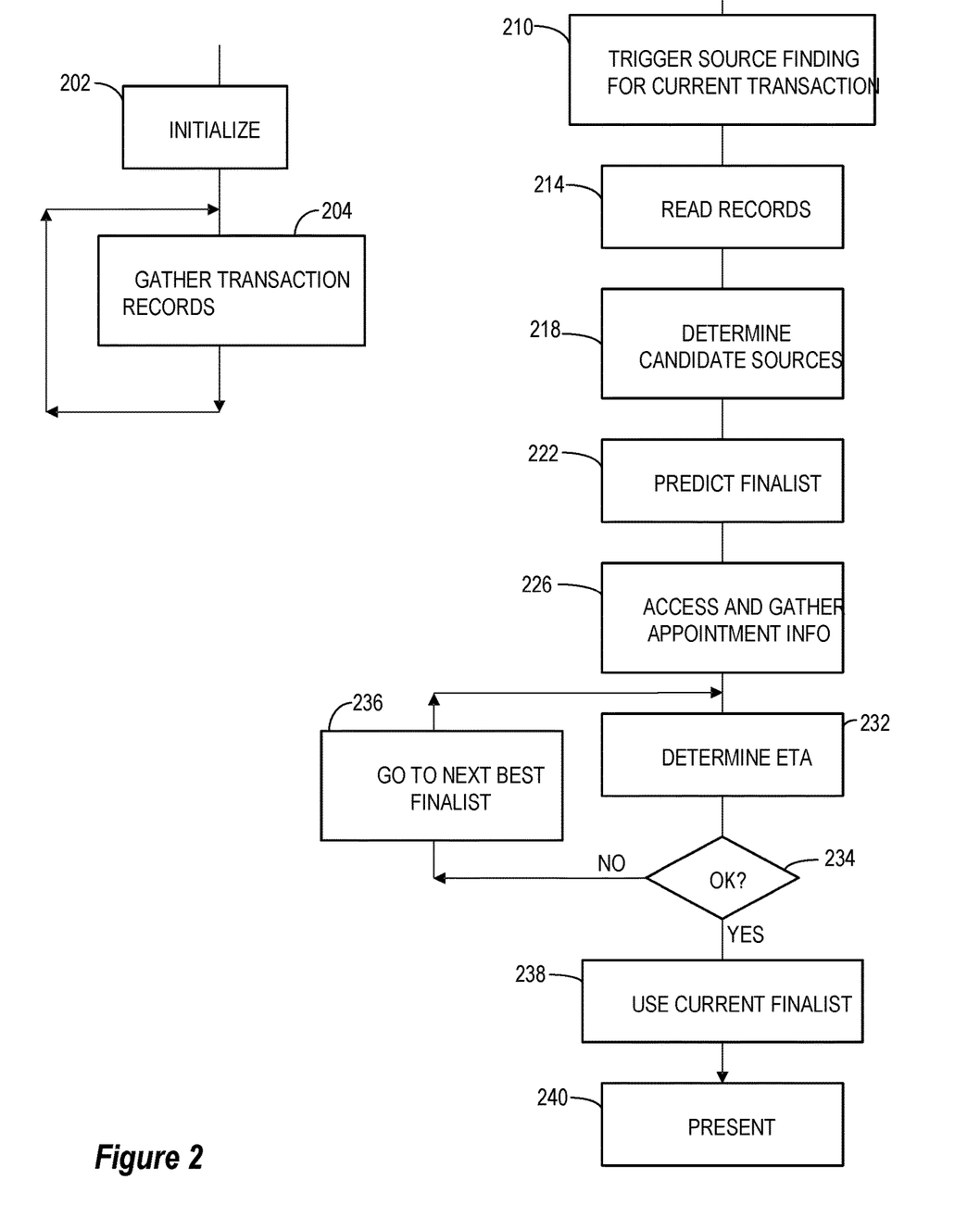
FIG. 2 is a flow chart depicting a process that is performed by the system disclosed herein operating according to a computer program product, according to at least one embodiment of the present invention.

Referring now to FIG. 2, a flow chart 200 is shown depicting a process that is performed by system 101 disclosed herein operating according to a computer program product, according to an embodiment of the present invention. For each user, system 101 is initialized 202 with data, such as through respective interfaces on user 102's mobile phones 108, where the initializing includes registering user 102's profile, including source attribute preferences, including linguistic constraints, etc. In one embodiment of the present invention, the system gathers 204, i.e., captures and stores, records of user 102 transactions (thereby providing a historical record of the transactions), including the following:

identity and geolocations of digital and non-digital sources;
reviews of the sources, which may include respective source attributes, such as courtesy, transaction time, negotiation affinity, languages spoken, etc.;
categories of resources offered by respective sources; and
attributes of the resources.

In a source finding mode, system 101 (including mobile phone 108 of user 102 and remote computer 103) is triggered 210 to perform actions described below in response to events for a current transaction by a current user (e.g., source finding or buying decision) with non-digital sources. In one alternative, the events indicate a current transaction due to user 102 entering an inquiry, such as by voice on mobile phone 108 interface, where the inquiry specifies a product or service, a type of proximity, e.g., line of sight, and a necessity level, e.g., optional, casual, desperate, urgent, etc. In one alternative, the events indicate a transaction based on searches user 102 has performed in a predetermined look back period, which may be a certain number of hours or days, depending on user 102 preference setting. In response to the events, remote computer system 103, which includes AR glasses 106 user 102 is wearing, identifies user 102 via mobile phone 108. System 101 determines intent of user 102 and is aware of user 102 needs through the initialized data, recent user searches and inquiry described above and through additional, live online data, such as social media of user 102, online meeting calendars, etc. Intent may be derived based on shopper's digital search for a specific product with an intent to buy, check product reviews and scores, seek social media feedback on a specification, ask voice assistant question about a product availability at a near-by physical brick and mortar store, etc. The intent derived determines if shopper wants to make buying decision or purely a window shopper doing causal inquiries or waiting for a promotion/clearance sale to occur, etc.

System 101 reads 214 records and determines 218 candidate sources for the current user, e.g., sources within user 102's line of sight. In one way of determining 218 candidate sources, system 101 captures images of individual sources in the current user's view, such as via a camera of AR glasses 106 worn by user 102, and system 101 sends the images to a remote computer (via mobile phone 108 or directly from AR glasses 106). In response to the images, remote computer system 103 may identify sources through image recognition technique such as region-based convolution neural network, and in the images remote computer system 103 may also recognize individual resources (e.g., products, also referred to as "items") available at respective ones of the identified sources, in which case remote computer system 103 may determine selected ones of the recognized items that match the inquiry, intent and needs.

In response to matches, remote computer retrieves resource attributes, such as quality and price data, of recognized items from digital sources servicing the location. Non-digital seller data also is retrieved if available, such as from the records obtained at initialization 202 and gathering 204 described above.

In one embodiment, system 101 predicts 222 (and, therefore, recommends) one of the candidate sources as a best choice for the current user, i.e., a finalist source (e.g., seller), and system 101 presents 240 the finalist source to the current user on the user 102's AR display as augmented reality along with the source attributes, location, distance, map, etc. and also factors forming the basis for the recommendation. See, for example, FIG. 8. The finalist source is recommended based on machine learning, which encompasses inputs including quality, courtesy, transaction time, and other factors described herein for an item available from the recommended source relative to alternative sources considered for similar item. For example, a recommendation that is output may suggest to shop from Seller 3, which has both ice cream and chocolates, is accommodative to Japanese conversation (linguistic aspect), is very friendly (courtesy aspect) and accepts return of chocolates if required. In another example, system 101 may analyze a request for purchasing a resource such as strawberries, determine three nearby street vendors next to one another on a crowded street have the resource, and may recommend seller 2 by evaluating historical transaction attributes such as friendly (courtesy), trust (price of strawberries being reasonable) and accommodative to Spanish (linguistic variations) in line with buyer price sensitivity, and priority of purchase.

In particular regarding the process for making recommendations, system 101 leverages weightage and rank algorithms when more than one non-digital and digital sellers are available for comparison purposes. (Since there are multi-dimension factors, system 101 determines relationships through continuous learning. Initialized weightage and rank that are assigned are changed with system 101 evolving and understanding the relationship patterns better.) A large and varied set of dependent attributes are inputs for predicting. In addition to those mentioned already, inputs may include source identification, item identification and category, user 102 profile (including personal interests/preferences), geographic location give an example of an item identification, seller identification and category, and weather. For example, ice-cream may be an identified item sold by three different sellers within the selected proximity. The sellers also have chocolates and candies, which qualify as category examples. Particularly due to the large and varied set of inputs, system 101 leverages bagging algorithms which encompasses multiple machine learning models, such as linear regression, random forest and support vector machine models ensembled for enhanced accuracy. Once a transaction is performed, system 101 feeds this back for reinforcement learning, i.e., to incorporate deviations into the algorithm for subsequent recommendations.

Additional examples of resource categories are such as the following:
  fresh produce such as apples, spinach, etc.
  apparel such as t-shirts, belts, wallets, etc.
  cold items ice-cream, chocolates, candies, beverages, roasted almonds, etc.
  others include Flowers, garlands, stationery, etc.

In one alternative, the process 200 includes factoring into its recommendations issues including appointment time, current time of day, shopping transaction time and walking time to user 102's destination. That is, system 101 determines the current time of day, as is well known to do, and determines appointed time for arrival at user 102's destination, such as from user input to system 101 or from information in user 102's appointment calendar. System 101 determines user 102's current distance to the appointed destination (i.e., friend's place, in this example), where system 101 determines distance based on user 102 location obtained from GPS 302, as stated herein above, and the location of the destination, such as from user 102 input to system 101, information in user 102's appointment calendar or from a map application on user 102's phone 108, in an instance where user 102 is using the app to navigate. System 101 also determines a reasonable walking pace for user 102, such as from historical walking records of user 102 collected by system 101 or from the map application. In an instance where it determines that user 102 has a sufficient amount of extra time to get to the destination—taking into account the current time, appointment time, amount of time system 101 determines user 102 needs to walk there and also transaction times at the respective shops that system 101 has collected from other users at each shop—system 101 may recommend a shop that is further away from user 102 but that provides a better overall experience for user 102, as system 101 determines is indicated by the factors that user 102 values, as described herein.

This matter of system 101 factoring in appointment time, current time of day, walking time and transaction time into account may also include system 101 recommending more than one shop to user 102 in some instances. That is, where system 101 determines the expected arrival time at user 102's designation is otherwise early enough relative to the appointment time, system 101 may determine and display respective ones of the nearby shops as best choices for respective ones of (or sets of) the items to be purchased. On the other hand, in an instance where user 102 has little time to spare for getting to the friend's place, system 101 factors more weight into shop transaction times and shop locations than other user values and recommends a single shop for purchasing all the items.

In recommending a final source (i.e., predicting a source that is a best choice for user 102), system 101 can evaluate time and distance factors concerning candidate sources based on input it receives about a) the user 102's distance from the location of user 102's appointed meeting, b) difference between current time of day and time of day of appointed meeting, c) expected transaction time at selected shop, and d) user 102's speed of travel in route to the shop and then to the meeting. For example, due a source failing to satisfy time and distance limitations as described herein above, system 101 may eliminate a source as a candidate.

One type of AI model (which may be a set of models) used by system 101 may make source predictions (i.e., predict a final source that is a best choice for a current user) based on clustering without needing to receive source attributes that are based on historical user 102 transactions. As to other users, model may receive merely the values of other users (desired source attributes and their weights) and historical selections of sources by those other users. (User selections of sources may be indicated by users merely communicating to system 101 that they have conducted a respective transaction with a respective one of sources.) This type of model first clusters candidate sources based on these historical selections of sources by other users and on weighted, desired source attributes of the other users. Then model finds one of the clusters that optimizes a fitting function for the weighted, desired source attributes of current user.

Another type of AI model (which may be a set of models) used by system 101 also uses input to optimize a fitting function in order to predict a final source that is a best choice for a current user and also obtains input indicating i) user desired attributes of the sources and ii) weights indicating how each user values those attributes. Accordingly, for such a model, like the previously described model, each user provides initial input to system indicating these parameters i) and ii), which each user may provide this initial input one time in an initialization process. However, for the presently described model, when users have transactions with ones of sources, each user provides actual attribute values of the respective sources, thereby providing a historical record of those actual attributes. The model makes a final source prediction by optimizing a fitting function for the actual attribute values of the respective candidate sources and the weighted, desired attributes of the current user.

It should be appreciated that without embodiments of the present invention, a user is often presented with uncertainty about which source (e.g., shop) has good attributes, e.g., varieties of wanted resources (e.g., items), good quality of the items, prices, transaction times, courtesy of shop personnel, languages spoken, forms of payment accepted and other desirable attributes of the shops and items. Consequently, the user may be dissatisfied with the shopping experience and may even be spend so much time attempting to sort out all the possibilities that user ends up arriving late at an appointed destination without having successfully obtained the needed items.

The following provides a detailed description of aspects concerning a cloud computing embodiment of the present invention. It is to be understood that although this disclosure includes this detailed description regarding cloud computing, implementation of the teachings recited throughout this application are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portility (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
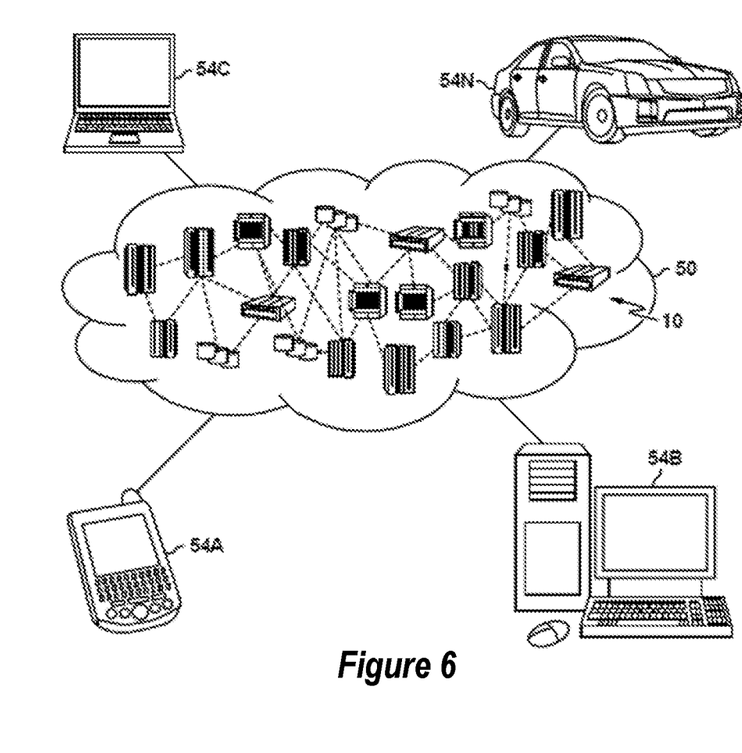
FIG. 6 depicts a cloud computing environment, according to at least one embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
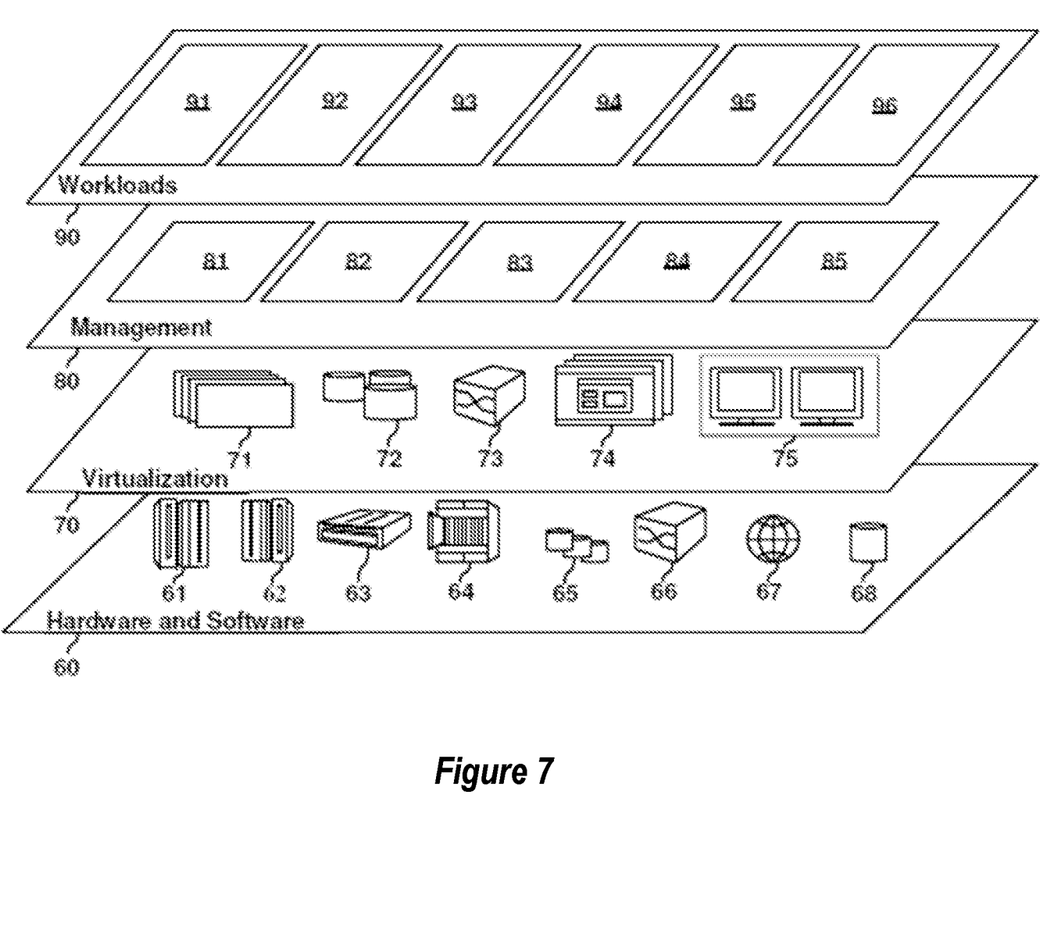
FIG. 7 depicts abstraction model layers, according to at least one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmented reality presentation and recommendations regarding proximate points of interest 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. Reference herein to a "procedure" is not necessarily intended to indicate implementation of invention embodiments in a procedural language.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Also, although features can be described above as acting in certain combinations and even initially claimed as such, features from a claimed combination can in some cases be excised from the combination, and the claimed combination directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Likewise, the actions recited in the claims can be performed in a different order and still achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A computer system implemented method for serving a first user, the method comprising:
    gathering, by a computer system, records of sources that each have no website and that the computer system, therefore, deems to be nondigital sources, wherein the gathering includes the computer system receiving identifications of the nondigital sources based on transactions of other users with the respective sources;
    training, by the computer system, an artificial intelligence model of images using the transactions of other users with the respective sources;
    using image recognition to identify images of individual sources captured from a device of the first user and within the first user's view;
    selecting, by the computer system, candidate sources for the first user from among the nondigital sources based on a geolocation of the first user and geolocations of the sources;
    selecting, by the computer system, a final source from among the candidate sources, wherein the computer system selecting the final source includes an artificial intelligence model fitting attributes of the candidate sources to attributes valued by the first user; and
    presenting the final source to the first user as a recommendation by the computer system.

2. The method of claim 1, wherein the selecting candidate sources by the computer system includes:
    determining a line of sight of the first user via input from sensors in glasses worn by the first user; and
    selecting the candidate sources from among ones of the nondigital sources that are within the line of sight.

3. The method of claim 1, wherein the selecting candidate sources by the computer system includes:
    selecting the candidate sources from among ones of the nondigital sources that are within a predefined distance from the first user.

4. The method of claim 1, wherein the artificial intelligence model fitting attributes of the candidate sources to attributes valued by the first user includes:
    an artificial intelligence bagging model computing a fitness measure of the candidate source attributes relative to the source attributes valued by the first user, wherein the bagging model includes linear regression, random forest and support vector machine models.

5. The method of claim 1, wherein the attributes valued by the user include transaction times at the sources and the method includes:
    gathering, by the computer system, records of the transaction times of the other users at the sources;
    wherein the selecting the final source includes:
    retrieving the transaction times for the candidate sources;
    determining a current time of day;
    determining an appointed arrival time for the first user at the appointed destination; and
    determining an amount of time it will take for the first user to travel to the appointed destination; and
    selecting the final source based on whether the gathered transaction times for the final source are short enough to permit the first user to travel to the appointed destination by the appointed arrival time.

6. The method of claim 5, wherein an instance occurs wherein the computer system determines that the first user has enough time to perform transactions at more than one of the candidate sources and still travel to the appointed destination by the appointed arrival time, and wherein for such an instance the method includes:
    selecting, by the computer system, a second final source from among the candidate sources.

7. The method of claim 1, including:
    presenting the candidate sources and attributes of the candidate sources to the first user visually on glasses worn by the first user.

8. A computer system for serving a first user, the system comprising:
    a processor; and
    a computer readable storage medium connected to the processor, wherein the computer readable storage medium has stored thereon a program for controlling the processor, and wherein the processor is operative with the program to execute the program for:
        gathering, by a computer system, records of sources that each have no website and that the computer system, therefore, deems to be nondigital sources, wherein the gathering includes the computer system receiving identifications of the nondigital sources based on transactions of other users with the respective sources;
        training, by the computer system, an artificial intelligence model of images using the transactions of other users with the respective sources;
        using image recognition to identify images of individual sources captured from a device of the first user and within the first user's view;
        selecting, by the computer system, candidate sources from among the nondigital sources based on a geolocation of the first user and geolocations of the sources;
        selecting, by the computer system, a final source from among the candidate sources, wherein the computer system selecting the final source includes an artificial intelligence model fitting attributes of the candidate sources to attributes valued by the first user; and
        presenting the final source to the first user as a recommendation by the computer system.

9. The computer system of claim 8, wherein the selecting candidate sources by the computer system includes:
    determining a line of sight of the first user via input from sensors in glasses worn by the first user; and
    selecting the candidate sources from among ones of the nondigital sources that are within the line of sight.

10. The computer system of claim 8, wherein the selecting candidate sources by the computer system includes:
selecting the candidate sources from among ones of the nondigital sources that are within a predefined distance from the first user.

11. The computer system of claim 8, wherein the artificial intelligence model fitting attributes of the candidate sources to attributes valued by the first user includes:
an artificial intelligence bagging model computing a fitness measure of the candidate source attributes relative to the source attributes valued by the first user, wherein the bagging model includes linear regression, random forest and support vector machine models.

12. The computer system of claim 8, wherein the attributes valued by the user include transaction times at the sources and the processor is operative with the program to execute the program for:
gathering, by the computer system, records of the transaction times of the other users at the sources;
wherein the selecting the final source includes:
retrieving the transaction times for the candidate sources;
determining a current time of day;
determining an appointed arrival time for the first user at the appointed destination; and
determining an amount of time it will take for the first user to travel to the appointed destination; and
selecting the final source based on whether the gathered transaction times for the final source are short enough to permit the first user to travel to the appointed destination by the appointed arrival time.

13. The computer system of claim 12, wherein an instance occurs wherein the computer system determines that the first user has enough time to perform transactions at more than one of the candidate sources and still travel to the appointed destination by the appointed arrival time, and wherein for such an instance the processor is operative with the program to execute the program for:
selecting, by the computer system, a second final source from among the candidate sources.

14. The computer system of claim 8, including:
presenting the candidate sources and attributes of the candidate sources to the first user visually on glasses worn by the first user.

15. A computer program product for a computer system serving first user, the computer program product comprising a computer readable storage medium having program instructions embodied therewith, the program instructions executable by a processor to cause the processor to:
gather, by a computer system, records of sources that each have no website and that the computer system, therefore, deems to be nondigital sources, wherein the gathering includes the computer system receiving identifications of the nondigital sources based on transactions of other users with the respective sources;
train, by the computer system, an artificial intelligence model of images using the transactions of other users with the respective sources;
using image recognition to identify images of individual sources captured from a device of the first user and within the first user's view;
select, by the computer system, candidate sources from among the nondigital sources based on a geolocation of the first user and geolocations of the sources;
select, by the computer system, a final source from among the candidate sources, wherein the computer system selecting the final source includes an artificial intelligence model fitting attributes of the candidate sources to attributes valued by the first user; and
present the final source to the first user as a recommendation by the computer system.

16. The computer program product of claim 15, wherein the selecting candidate sources by the computer system includes:
determining a line of sight of the first user via input from sensors in glasses worn by the first user; and
selecting the candidate sources from among ones of the nondigital sources that are within the line of sight.

17. The computer program product of claim 15, wherein the selecting candidate sources by the computer system includes:
selecting the candidate sources from among ones of the nondigital sources that are within a predefined distance from the first user.

18. The computer program product of claim 15, wherein the artificial intelligence model fitting attributes of the candidate sources to attributes valued by the first user includes:
an artificial intelligence bagging model computing a fitness measure of the candidate source attributes relative to the source attributes valued by the first user, wherein the bagging model includes linear regression, random forest and support vector machine models.

19. The computer program product of claim 15, wherein the attributes valued by the user include transaction times at the sources and the program instructions are executable by the processor to cause the processor to:
gather, by the computer system, records of the transaction times of the other users at the sources;
wherein the selecting the final source includes:
retrieving the transaction times for the candidate sources;
determining a current time of day;
determining an appointed arrival time for the first user at the appointed destination; and
determining an amount of time it will take for the first user to travel to the appointed destination; and
selecting the final source based on whether the gathered transaction times for the final source are short enough to permit the first user to travel to the appointed destination by the appointed arrival time.

20. The computer program product of claim 19, wherein an instance occurs wherein the computer system determines that the first user has enough time to perform transactions at more than one of the candidate sources and still travel to the appointed destination by the appointed arrival time, and wherein for such an instance the program instructions are executable by the processor to cause the processor to:
select, by the computer system, a second final source from among the candidate sources.

\* \* \* \* \*